UNITED STATES PATENT OFFICE.

JOHN GRAHAM, OF BOSTON, MASSACHUSETTS.

PYROTECHNIC COMPOUND.

SPECIFICATION forming part of Letters Patent No. 535,495, dated March 12, 1895.

Application filed August 11, 1894. Serial No. 520,053. (No specimens.)

*To all whom it may concern:*

Be it known that I, JOHN GRAHAM, of Boston, in the county of Suffolk and State of Massachusetts, have invented a new and useful Improvement in Compounds for Colored Fires, of which the following, taken in connection with the accompanying drawings, is a specification.

My compound is fluid and is adapted to be used in connection with some absorbent material, preferably fire proof, like asbestos, and is to be used for blue lights, to burn in the open air for signal lights or for illuminating purposes. It is produced as follows: Take three hundred and twenty grains of powdered zinc, and eighty grains of powdered selenium, and mix in one gallon pure disulphide of carbon This compound will remain unchanged for a long time and is not explosive although highly inflammable and difficult to extinguish.

I prefer to use it in the following manner: Fill a wire or other suitable open work receptacle with asbestos or some other absorbent material, then saturate the same with my compound and ignite.

The proportions of zinc and selenium may be varied to a considerable extent and yet produce a good result. In some cases the zinc may be omitted and a larger proportion of selenium used or some material analogous to zinc might be used.

What I claim, and desire to secure by Letters Patent, is—

The herein described composition of matter to be used for producing colored lights, consisting of zinc, selenium, and disulphide of carbon, in the proportions specified.

In testimony whereof I have signed my name to this specification, in the presence of two subscribing witnesses, on this 9th day of August, A. D. 1894.

JOHN GRAHAM.

Witnesses:
FRANK G. PARKER,
WILLIAM SEARS.